United States Patent [19]
Dobson et al.

[11] Patent Number: 5,237,857
[45] Date of Patent: Aug. 24, 1993

[54] DOWN-HOLE LIQUID DETECTING APPARATUS

[75] Inventors: Andrew R. Dobson, Etobicoke; Richard J. Belshaw; Douglas J. Belshaw, both of Georgetown, all of Canada

[73] Assignee: Solinst Canada Limited, Ontario, Canada

[21] Appl. No.: 483,759

[22] Filed: Feb. 23, 1990

[30] Foreign Application Priority Data

Jul. 11, 1989 [GB] United Kingdom ............... 8915876

[51] Int. Cl.⁵ .................... E21B 47/04; G01N 27/06; G01N 21/17
[52] U.S. Cl. .................................. 73/61.44; 73/151; 250/565; 250/338.5; 324/696
[58] Field of Search ............... 340/619, 620, 621, 622; 73/61 R, 61.1 R, 304 R, 151; 324/691, 696, 699, 693; 250/577, 565, 338.5

[56] References Cited

U.S. PATENT DOCUMENTS

| | | | |
|---|---|---|---|
| 1,721,374 | 7/1929 | Dantsizen | 324/698 |
| 2,607,220 | 8/1952 | Martin | 73/151 |
| 2,669,875 | 2/1954 | Wuenscht | 73/313 |
| 4,523,465 | 6/1985 | Fasching et al. | 73/304 R |
| 4,624,309 | 11/1986 | Schnatzmeyer | 73/151 |
| 4,703,314 | 10/1987 | Spani | 340/619 |
| 4,747,451 | 5/1988 | Adams, Jr. et al. | 73/155 |
| 4,920,336 | 4/1990 | Meijer | 250/577 |

FOREIGN PATENT DOCUMENTS

| | | |
|---|---|---|
| 697101 | 10/1940 | Fed. Rep. of Germany . |
| 2514291 | 10/1976 | Fed. Rep. of Germany . |
| 2924903 | 1/1981 | Fed. Rep. of Germany . |
| 619778 | 10/1980 | Switzerland . |

*Primary Examiner*—Hezron E. Williams
*Assistant Examiner*—Michael Brock
*Attorney, Agent, or Firm*—Anthony Asquith & Co.

[57] ABSTRACT

The probe (20) includes a conductivity sensor (38) and an optical sensor (39) for detecting the depth of a layer of oil, gasoline, etc floating on the surface of water in a well. A battery (60) is included in the probe, and a resistor (R1) is provided in series with the conductivity sensor. When the probe is in oil, both sensors are OFF, and no voltage is detectable at the surface; when the probe is in air, the optical sensor is ON and the conductivity sensor is OFF, so that a maximum voltage is detectable at the surface; and when the probe is in water, the optical sensor is OFF and the conductivity sensor (with its resistor) is ON, so that an intermediate voltage, as set by the value of the resistor, is detectable at the surface.

15 Claims, 3 Drawing Sheets

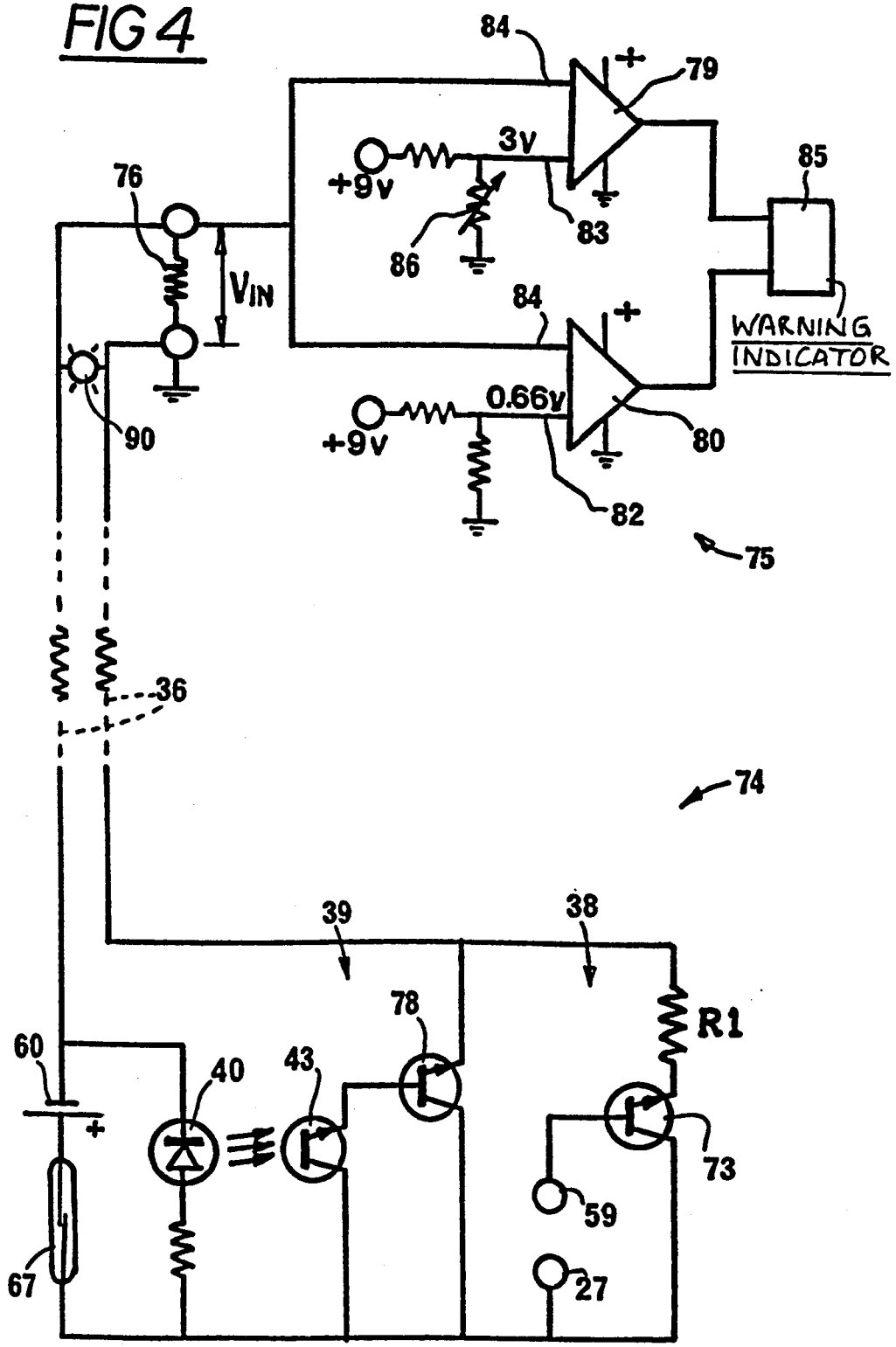

DOWN-HOLE LIQUID DETECTING APPARATUS

This invention relates to the detection of liquid levels in ground-holes, such as wells. The invention relates also to identifying the type of liquid detected.

BACKGROUND OF THE INVENTION

The investigations with which the invention is concerned involve lowering a probe down the hole. The probe contains sensors which detect and identify the fluids encountered.

It is known that the difference between air and liquid may be detected by means of an optical sensor. A beam of light is made to shine through an interface between the fluid and a transparent material such as glass. If the fluid is air, the beam is refracted in one mode; if the fluid is water or another liquid, such as gasoline, the beam is refracted in another mode. A light sensor, such as a phototransistor, is used to signal the different modes of refraction, and thus to signal the level at which the liquid is encountered.

The optical sensor does not determine the type of liquid, however. Although both water and gasoline have refractive indexes which differ substantially from that of air, they do not differ very much from each other. It is impractical to use refraction as the agency for distinguishing water from gasoline. (Although gasoline is a common contaminant encountered in ground water, the technology is applicable also to other hydrocarbon contaminants: the generic term "oil" is used hereinafter.)

It is known that the difference between oil and water may be detected by measuring the electrical conductivity of the liquid. The resistivity of oil is very high: in fact oil is, in practical terms, indistinguishable from air on the basis of its resistivity. The resistivity of water, on the other hand, is comparatively low.

The down-hole probe therefore contains an optical sensor and a conductivity sensor. The optical sensor contains a light emitter (LED) which generally remains ON while the probe is down the hole, and a light sensor, which detects whether or not the light beam from the light has been refracted. The conductivity sensor comprises a pair of electrodes which are immersed in the liquid, and the resistivity of the liquid is measured by passing a current therebetween.

The probe is attached to a suspension tape, by means of which the probe is lowered down the hole. The tape is marked with a scale to indicate the lowered depth. It is an advantage for the tape to also include within its structure the electrical leads necessary for the operation of the sensors, rather than separate loose leads. Hitherto, to operate the two sensors it has been necessary to provide at least three electrical leads running between the probe and the surface.

The invention provides an apparatus which requires the use of only two leads, yet which is aimed at providing reliable operation of the two sensors.

GENERAL FEATURES OF THE INVENTION

The invention provides a means for ensuring that the electric current conducted through one of the two sensors is substantially greater than the electric current conducted through the other of the two sensors. This is done preferably by placing a resistor in series with one of the sensors, but not the other.

The invention preferably provides that a battery is mounted upon, and carried down with, the structure of the down-hole probe. The sensors are mounted in parallel with each other: both are supplied from one side of the battery, and both are connected to a first one of the down-hole leads. The other of the down-hole leads is connected to the other side of the battery. At the surface, a means is provided for measuring the voltage between the two leads.

Thus, if a low or zero voltage exists between the two leads, this indicates that both sensors are OFF. If a large voltage exists, this indicates that the sensor WITHOUT the resistance is ON. If an intermediate voltage is detected, this means that the sensor WITH the resistance is ON.

The voltage between the two down-hole leads is measured, at the surface, to determine whether the voltage is low, medium, or high; and the result of that determination is used to signify whether the probe is in air, oil, or water.

A number of other approaches might be contemplated to the problem with which the invention is concerned, i.e. of using just two wires to transmit the condition of two independent sensors.

In the invention, preferably a resistor is placed in series with one of the sensors; the presence of that resistor is detectable at the surface, whereby it can be determined at the surface which of the sensors it is that is ON or OFF. Thus, the resistor is used as the agency that distinguishes between the two sensors.

Other possibilities might be considered as the agency for distinguishing between the two sensors. For example, frequency might be considered as the agency: that the condition of the optical sensor might be determined by detecting a first frequency, and the condition of the conductivity sensor might be determined by detecting a second frequency. However, the use of frequency has drawbacks: low frequencies are often present in the ground, and might be detected accidentally; and shielding of the wires would be required if high frequencies were used. Besides that, quite substantial parasitic capacitances are present, and these might interfere with the capacitors used for detecting the frequency differences, possibly making the measurements inaccurate. In the invention, it is recognized that the use of the resistor allows dc to be used, and parasitic capacitances may therefore be ignored.

It is important that the sensors be not too sensitive (and of course it is important that they be sensitive enough). It has been found that the required degree of sensitivity is easy to achieve when the sensitivity is based on dc voltage levels, as described.

In the invention, preferably the in-hole probe itself is provided with a battery. The fact that the probe includes a battery (as compared with the situation where the probe did not inlude a battery and power is supplied to the probe from the surface) means that the sensors in the probe may be provided with active, or powered, components. If only passive components could be used, it is recognised that it would in practice be very difficult to monitor the condition of the sensors from the surface with the required degree of accuracy.

The invention preferably provides a resistor in series with one of the sensors, and provides a battery in the in-hole probe. As a result, the invention requires in the two wires the presence only of dc voltage levels, as signals. Thus, the components in the probe itself may be active, i.e. powered, and yet there is no requirement for power to be transmitted down the wires. Only signals, which are in the form of dc voltage levels, are transmitted between the probe and the surface, not power.

It may be noted that, in the preferred form of the invention, the two wires leading from the surface to the probe are included along with the down-hole battery as components of a first complete circuit. The circuit at the surface which is used to measure the signal voltage, and which of course includes its own power supply, is a second, separate complete circuit. By grounding these two complete circuits together at an appropriate point, at the surface (as will be described presently) the signal voltage need only be sensed at the surface simply as a voltage difference, and not as an absolute value.

The reason for preferring a suspension tape which has only two leads lies in its simplicity of construction. The two-lead tape simply comprises an extrusion of plastic, with the leads embedded in beads running along the edges of the tape, the distance scale being printed on the central ribbon part of the tape. Tapes that have three or more conductors are considerably more expensive to produce than two-conductor tapes; are less reliable in service due to their vulnerability to damage-induced short circuits; and are more bulky and less flexible as regards coiling and stowage of the tape when not in use.

The presence of a battery in the probe is something of a disadvantage, since the battery must be replaced periodically. Also, the battery is a relatively bulky item, and a probe which contains a battery cannot be very slim. However, the apparatus in mainly for use in wells which are generally of at least 30 mm diameter, and the other disadvantages are minor.

DETAILED DESCRIPTION OF PREFERRED EMBODIMENT

By way of further explanation of the invention, an exemplary embodiment of the invention will now be described with reference to the accompanying drawings, in which:

FIG. 1 is a horizontal cross-section of a down-hole probe, the probe being a component of an apparatus which embodies the present invention;

FIG. 2. is a cross-section on line 2—2 of FIG. 1;

FIG. 4 is a diagram of an electrical circuit, which also is a component of the said apparatus;

Figure 1:
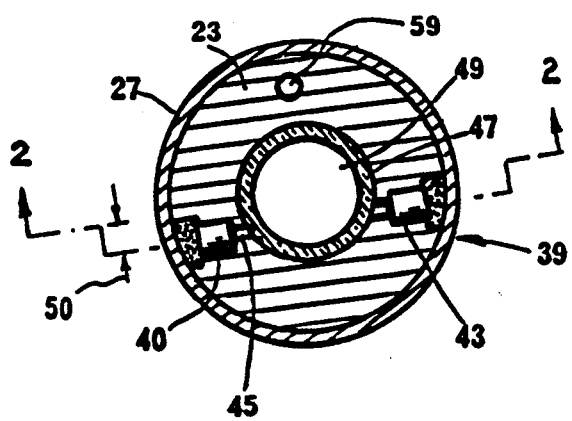
Figure 3:
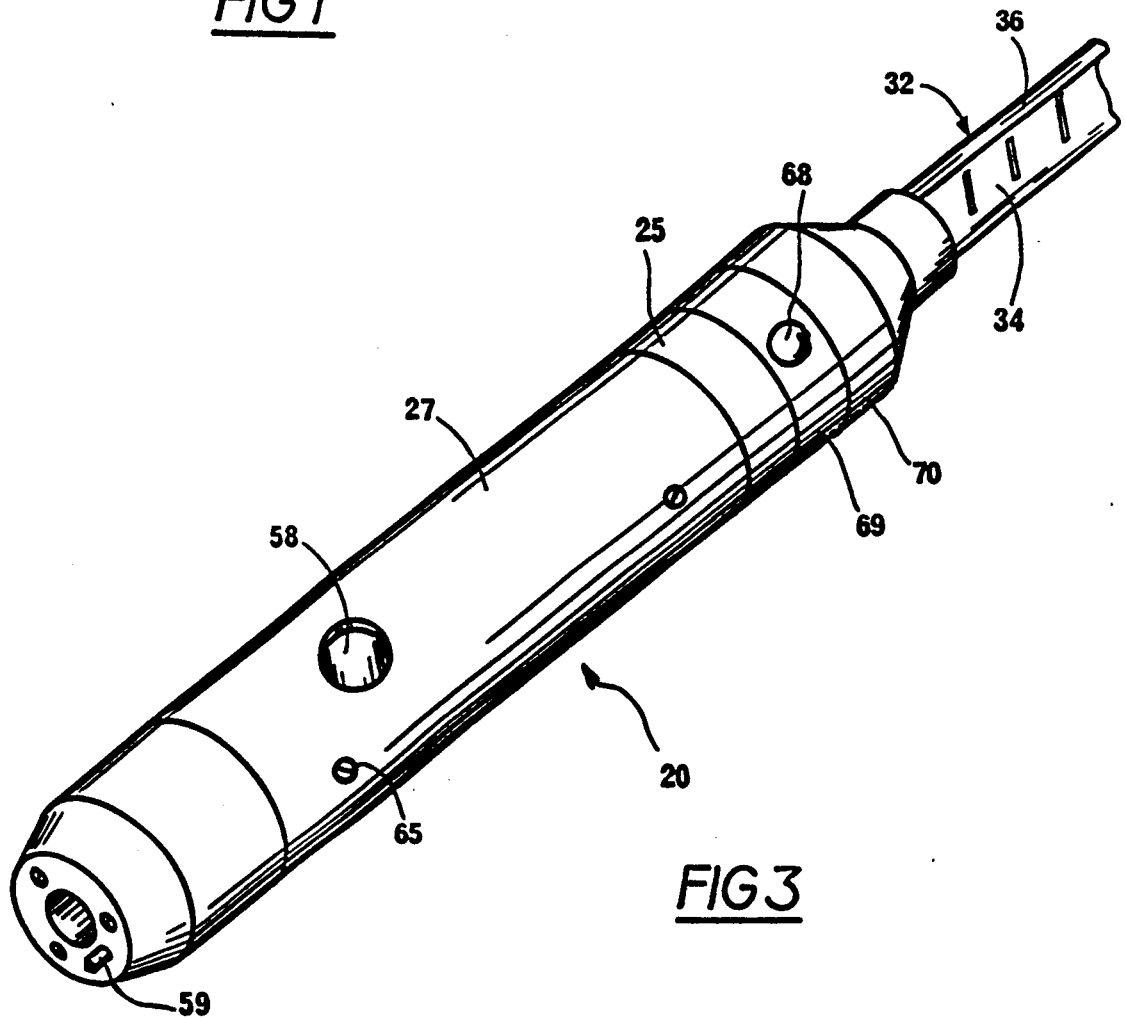
FIG. 3 is pictorial view of the said probe.
Figure 2:
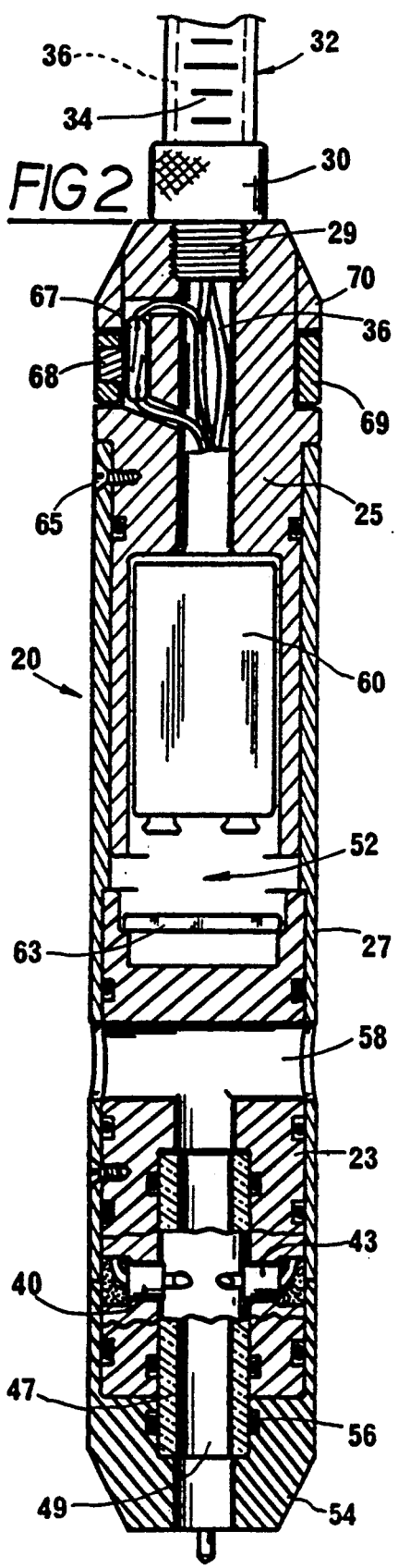
FIG. 2A is a cross-section, perpendicular to line 2—2, of a portion of the probe of FIG. 1.
Figure 2A:
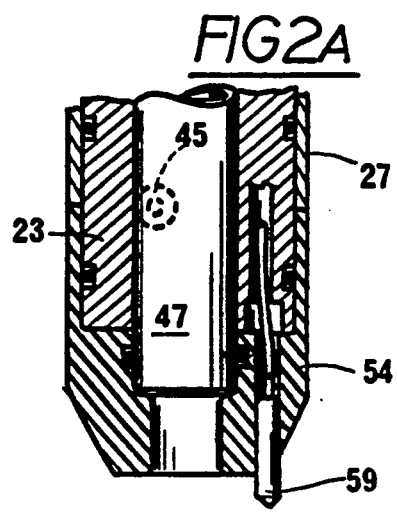

The apparatus shown in the accompanying drawings and described below is an example of an apparatus which embodies the invention. It should be noted that the scope of the invention is defined by the accompanying claims, and not necessarily be specific features of exemplary embodiments.

The probe 20 includes a lower body 23, and upper body 25, and a cover 27. The upper and lower bodies 23,25 are made of Delrin (TM) or other inert plastic, and the cover 27 is made of a metal such as stainless steel.

The upper body 25 is provided with a tapped hole 29 into which is screwed an adapter 30. The adapter 30 comprises a receptacle for mounting a measuring and suspension tape 32. The tape 32 includes a core portion 34, made of plastic, which is marked with a scale, and side portions, which are thicker than the core portion 34, and which contain electrical leads 36 embedded therein. The tape 32 is the only connection to the surface when the probe is down the hole, and the tape thus is responsible for three functions, i.e.: supporting the weight of the probe; indicating the depth of the probe; and conducting the electrical signals from the probe.

The probe 20 includes two sensors, a conductivity sensor 38 and an optical sensor 39. The optical sensor 39 comprises a light emitting diode 40 and a photo-transistor 43. These items are mounted at the ends of a horizontal through-hole 45 formed in the lower body 23. Also provided in the lower body 23 is a central bore, into which is received a tube 47, made of glass. The through-hole 45 is offset with respect to the axis of the tube 47, i.e. the axis of the hole 45 lies on a chord of the tube 47, as may be seen in FIG. 1.

In operation of the optical sensor 39, the LED 40 emits a beam of light, which passes through the wall of the glass tube 47, across the space 49 inside the tube, back through the wall of the tube, and into the photo-transistor 43. If a liquid is present in the space 49, the light beam is refracted away from the photo-transistor 43. Thus, the presence of a liquid—any liquid—within the space 49 will prevent the light beam from reaching the photo-transistor 43.

The expression "light" in relation to the optical sensor should be construed as including such radiation as infra-red radiation, in addition to visible light radiation. Infra-red is preferred in many applications.

The design of the optical sensor 39 requires careful attention. In the particular probe shown, the outer diameter of the glass tube is 15.5 mm. The off-centre distance 50 to the axis of the through-hole 45 is 4.57 mm. If the designer sets the distance 50 too large, the beam would be reflected internally within the wall of the glass tube 47; if he sets the distance 50 too small, the angle of reflection will be too small, and light may reach the transistor 43 even when liquid is present in the space 49.

Also, the power of the LED must not be too great: light from the LED is scattered somewhat when the liquid is present, and if the beam were powerful the transistor 43 might be actuated by stray scatter. It is possible to attenuate the amount of light passing into the space 49, by reducing the diameter of the through-hole 45. A diameter of 1.27 mm has been found to give good freedom from spurious results from scatter pickup-up with a comparatively high-powered infra-red LED 40.

The above dimensions should not be construed as limitations to the scope of the invention: they are intended merely as examples which have been found to give satisfactory results.

Good results have been obtained also from a glass tube of 15.88 mm diameter, when the offset 50 has been set at 6.92 mm. For a comparatively low-powered infra-red LED 40, a through-hole diameter of 1.78 mm was found to give good freedom from problems due to scatter-activation.

It is also important that the LED 40 and the light-sensitive transistor 43 be set carefully and accurately within the hole 45. Respective pockets are provided at the ends of the hole 45 for containing the optical components. The optical components are cemented in place with potting compound once they have been correctly mounted in the pockets. It may be noted that the components, once set, may be relied upon not to move. The optical sensor 39 is therefore very robust as regards its ability to maintain its sensitivity and accuracy, even when the probe is subject to knocks and other abuse.

The electrical leads from the optical components 40,43 are passed along suitable grooves or holes (not shown) formed in the lower body 23, and into the chamber 52.

The glass tube 47 is secured in place within the lower body 23 by means of a bolted-on end cap 54, made of plastic. O-rings 56 keep liquid in the space 49 from entering that area of the outer diameter of the tube 47 at which the optical components operate.

When the probe is lowered into the ground hole, and a liquid is encountered, the liquid after entering the space 49 may pass out through the exit ports 58.

The optical sensor 39 does not determine the nature of the liquid in the space 49. Whether the liquid is water or e.g. gasoline is indicated by the conductivity sensor 38, which will now be described.

The cover 27 is made of metal, and forms one electrode of the conductivity sensor. The other electrode comprises a rod of metal 59 which is cemented into the plastic end cap 54.

The liquid-contacting end of the rod electrode 59 protrudes slightly from underneath the sensor, and lies well below the cover 27. When the probe is lowered into the ground hole, the rod electrode is well immersed into any liquid that may be encountered, well before the cover 27 contacts the liquid.

The conductivity sensor 38 becomes operational of course only when both electrodes are immersed in the liquid: by having the rod electrode 59 first well immersed in the liquid, and then by providing the cover 27 as a comparatively very large electrode, which touches the liquid over a large area all at once, the conductivity sensor can be very reliable and accurate in the signals it provides. It is advisable, in a probe of the kind described, where the two sensors complement each other operationally, that the sensors have roughly the same characteristics of accuracy and reliability.

Housed within chamber 52 in the upper body 25 is a battery 60, and a circuit board 63 containing the various electronic components is also provided. The battery and the board may be kept in place by forming the body 25 to a complementary size and shape.

To change the battery 60, the cover 27 may be separated from the upper body 25. This is accomplished by removing the screws 65. It may also be noted that the cover 27 is secured to the lower body 23 by means of such screws.

It is advisable to provide a switch upon the probe, for the purpose of switching off the battery 60 when the probe is not in use. As shown, such a switch comprises a reed switch 67. The reed switch is of the kind that may be activated by placing a magnet close to the reed switch. Such a magnet 68 is mounted in a rotatable ring 69.

The ring 60 is a loose fit on the upper body 25. The ring 69 rests between a shoulder formed in the material of the upper body 25 and a fixed ring 70 which is a tight, interference fit on, and is also pegged to, the body 25. The fixed ring 70 is machined flush with the body 25, so as to give a neat appearance.

Prior to use of the probe, the ring 69 is rotated until the magnet 68 lies over the reed switch 67, operating the switch. The ring is left in that position during operation of the probe. After use, the ring 69 is rotated until the magnet 68 is clear of the switch 67. Datum marks, or detents, may be provided to assist in the correct positioning of the ring 69.

It may be arranged that when the probe 20 is not in use, the storage receptacle in which the probe is stored is provided with a sensor for detecting whether the switch 67 has been turned off, and for emitting a suitable warning, if not.

The electrical circuit of the apparatus is shown in FIG. 4. When the probe is in air, the light beam from the LED 40 falls on the photo-transistor 43, and the optical sensor 39 is therefore in the ON condition. In air, there is no connection between the two electrodes of the conductivity sensor 38, which is therefore OFF.

In any liquid, i.e. "not air", the optical sensor 39 goes OFF. In water, the conductivity sensor 38 goes ON. In gasoline, or other high-resistivity hydrocarbon contaminant (oil) the conductivity sensor goes OFF.

The electronic components are arranged in groups. Group 74 includes the components in the probe 20 itself, while the components in group 75 are those that remain above ground. Electrical leads 36 connect the two.

Since only two wires 36 are available, in the invention, for transmitting the state of the two sensors 38,39 to the surface, means must be provided for distinguishing between the two sensors, as will now be described.

In the embodiment described, a resistor R1 is provided in series with the transistor switch 73 that is activated in the conductivity sensor 38. No such resistor is provided in respect of the transistor switch 78 of the optical sensor 39. Thus, the detected presence of a high voltage at the surface may be taken as an indication that the optical sensor, without the resistor, is ON. When no voltage (or almost no voltage) is detected at the surface, that indicates that both sensors are OFF. When an intermediate voltage is detected is at the surface, that indicates that the conductivity sensor, with the resistor in series, is ON, and the optical sensor, without the resistor, is OFF.

It is possible for a combination of two sensors, each having ON and OFF states, to send four signals, i.e. ON/ON, ON/OFF, OFF/ON, and OFF/OFF. The arrangement of the present circuit is such that when the optical sensor, without the resistor, in ON, it is not possible to detect whether the conductivity sensor, with the resistor, is ON or OFF. Thus, with the arrangement, only three conditions can be signalled: but only three are needed, however, to signal the three fluids, either air, oil, or water.

Figure 5:
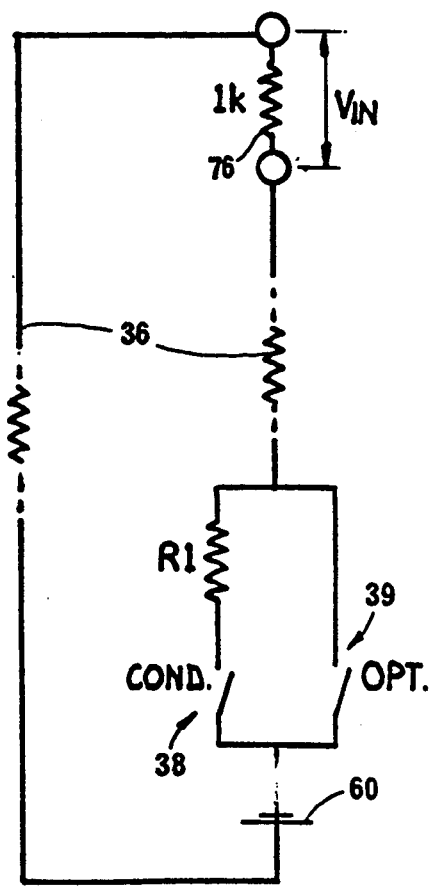
FIG. 5 is a representation of part of the diagram of FIG. 4.

The disposition of the various resistors and resistances, leading up to the reference resistor 76 at the surface, is shown in FIG. 5.

The nature of the leads 36 is such that their resistance may be estimated at three ohms per meter. The leads 36 form part of the suspension tape 32 and are permanently attached to the probe. Probes may be sold with different lengths of tape attached. The practical range would be from about 30 meters to as much as 500 meters.

The switch transistor 73 of the conductivity sensor, and the corresponding switch transistor 78 of the optical sensor, may be attributed resistances, when conducting, of zero, for the purpose of illustration.

The resistor R1, in series with the switch transistor 73 of the conductivity sensor 38, in the example, has a value of 4.7 kOhm. The reference resistor 76 has a value of 1 kOhm.

The following may be understood from FIG. 5:

When the optical sensor 39 is ON and the conductivity sensor 38 is OFF (the in-air condition) the only resistances in circuit, apart from the reference resistor 76, are those of the leads 36. Therefore, the voltage Vin, as measured at the surface, will be HIGH when the probe is in air.

When the optical sensor 39 is OFF and the conductivity sensor 38 is ON (the in-water condition) the resistor R1 is now included in the circuit. The voltage Vin therefore drops to an intermediate value when the probe is in water.

When both sensors are OFF (the in-oil condition) the resistance becomes very large, and the voltage Vin becomes very low, or practically zero.

With the typical practical component values as described, and with a fresh battery 60, the values of the voltage Vin as actually measured would be in the region of: high (air) 7.4 v; intermediate (water) 1.8 v; low (oil) 0.04 v.

It may be noted that the voltage levels relative to the battery 60 are not important; Vin is simply the difference in voltage across resistor 76, irrespective of what the voltage levels are with respect to the in-probe battery. The fact of having a battery present in the probe, and of coupling one of the leads 36 to the ground potential of the surface group 75 of components, means that the voltage to be sensed at the resistor 76 is merely a difference between two voltage levels. One end of the resistor 76 is grounded to the same ground as the surface components 75: thus the ground potential of the surface components is not required to be the same as the ground potential of the in-hole components 74.

This is an advantage, which arises from the provision of the battery within the probe. The leads 36 have a resistance of about three ohms per meter, and this cannot be avoided: if power had to come entirely from the surface, the fact of having to accommodate the voltage drop over the leads would dominate the design of the whole apparatus.

The presence of the different Vin voltages is detected and used to operate warning lights (or alarms etc) in the following manner.

Two operational amplifiers 79,80 are provided, the purpose of which is to detect which of the three voltage levels, high, intermediate, or low, is present as Vin across the reference resistor 76.

In the particular example shown, a reference voltage of 0.66 volts is applied to the reference input pin 82 of the lower op-amp 80, and a reference voltage of about 3 volts (this voltage is adjustable, as will be described) is applied to the reference input pin 83 of the upper op-amp 79. These voltages represent the respective operational threshold settings of the two op-amps.

Thus, if the voltage Vin is high, i.e. greater than 3 volts, (as it is when the probe is in air) both op-amps 79,80 are activated. If the voltage Vin is intermediate, i.e. between 3 volts and 0.66 volts (as it is when the probe is in water), only the lower op-amp 80 is activated. If the voltage Vin is low, i.e. less than 0.66 volts (as it is when the probe is in oil), neither of the op-amps is activated.

The outputs from the op-amps 79, 80 may be used to activate a suitable warning indicator 85. For example, the designer may provide in the indicator 85 two lamps, and may provide that the shining of one lamp indicates water, both lamps indicates oil, no lamps indicates air; or he may provide three lamps, one for each fluid.

As mentioned, the changeover in voltage level between "low" and "intermediate" is 0.66 volts in the above example. This voltage level corresponds, theoretically, to a total resistance, in the circuit as shown in FIG. 5 of the 9 volt battery 60, of about 13 kOhm. Thus, if the sum of the in-circuit resistances in the FIG. 5 circuit is less than 13 kOhm, the voltage Vin will exceed the threshold setting of the lower op-amp 80, which will therefore be activated. If the sum of the in-circuit resistances in the FIG. 5 circuit is more than 13 kOhm, neither op-amp will be activated.

In the same way, the changeover between the "intermediate" voltage level and the "high" voltage level is set at 3 volts. Therefore, if the sum of the in-circuit resistances in the FIG. 5 circuit is less than about 2 kOhm, the voltage Vin will be more than the 3 volt threshold settings of the upper op-amp 79. If the sum of the in-circuit resistances in the FIG. 5 circuit becomes more than 2 kOhm, the voltage Vin will be less than 3 volts, and the upper op-amp 79 will not be activated.

The selection of the threshold voltage levels at which the changeovers are to occur requires some care on the designer's part. The thresholds should be set so that the thresholds cannot be exceeded accidentally by spurious voltages, and there should be ample margin between the thresholds of the two op-amps.

As a feature of the invention, it is recognized that there is available to the designer a sufficient margin of tolerance between the two thresholds to ensure reliable operation.

As mentioned, the threshold setting of the upper op-amp is adjustable. This fact allows the tolerance margin on the setting of the upper op-amp to be very small. In fact, the adjustability is utilized during assembly of the apparatus to calibrate the apparatus in accordance with the resistance of the particular leads 36. The changeover voltage of the upper op-amp is adjusted, during assembly of the apparatus, in such a manner that when the probe is in water, and the voltage Vin is therefore at the intermediate level, the threshold is adjusted until the upper op-amp is just activated. During the in-water condition, the resistance in the FIG. 5 circuit is accounted for almost completely by the resistance of the leads 36 (apart from the reference resistor 76).

For example, if the resistance of the leads 36 in a particular apparatus were 1.85 kOhm, which corresponds to a Vin of 3.16 volts, the threshold of the upper op-amp could be adjusted to say 3.2 volts. Thus, any Vin even only slightly over 3.2 volts would be treated as a "high" voltage; this is acceptable because it may be assumed that the voltage could not exceed that value in any spurious or accidental manner.

The resistance of the leads 36 might vary a good deal from instrument to instrument, but this variability is catered for by the fact that the threshold of the upper op-amp is adjustable. The resistance of the wires 36 in a particular apparatus would not be expected to change, even over a long period of service, but even if it did change, the threshold setting could be re-adjusted periodically, as an expert service item, if required.

A corresponding adjustability may be added to the lower op-amp 80, but that will not generally be necessary. The designer sets the threshold of the lower op-amp on the assumption is that it is not possible for the apparatus to produce a Vin of less than the set value unless the probe is in oil. At 0.66 volts, this assumption is sufficiently valid for the apparatus to be useful. The designer sets the level of the threshold of the lower op-amp in accordance with the resistivity of the fluids, not as a result of anything on the apparatus itself. It is fundamental, of course, to the type of instrument with which the invention is concerned that there exists a clear demarcation between the conductivity of hydrocarbon contaminants and the conductivity of water, so that measuring the conductivity of the liquid can serve as the determinant of the nature of the liquid.

In the conductivity sensor 38, the metal cover 27 acts as the upper electrode, and therefore the level of the bottom of the cover is the level at which the conductivity sensor operates. For good accuracy of a conductivity sensor, it is important that the electrodes make a good contact with the liquid: thus if the upper electrode were, for example, merely a small point, inaccuracies in the depth at which actuation took place might creep in. The cover 27, however, encircles the probe, and full, intimate, large-area contact is made virtually instantaneously. Therefore the depth at which the conductivity sensor is activated is very clearly defined, which makes for an accurate measurement. The lower electrode is not so critical, since the rod 59 is well immersed in the liquid at the time the upper electrode becomes operational.

The liquid within the interior 49 of the glass tube 47 operates the optical sensor, whereas the liquid outside the probe operates the conductivity sensor. But the operating depths or levels of the two sensors are the same.

It is important that the two sensors operate at the same level or depth. A difference in the operating levels might be received as a signal that oil was present when in fact it was not present. With the layout and arrangement of the sensors as shown, it is an easy matter to set the two sensors to operate at the same depth, within a tolerance margin of 1 mm or so. A film of oil thinner than that in any case can generally be ignored.

The zero point of the distance scale on the tape should be the actuation depth of the sensors.

In the invention, one of the sensors is provided with a resistor; and a major aspect of the invention lies in the recognition that only two leads are needed to allow the presence or absence of the resistor to be detected reliably at the surface. As to which of the sensors should be given the resistor, it is preferred, in the invention, that the conductivity sensor, not the optical sensor, be the one which is given the resistor, for the following reasons.

It is desirable that an indicator 90 be included in the apparatus, to indicate at the surface that the switch 67 is ON, and also to monitor the condition of the battery 60. It would be most inconvenient if the probe had to be immersed in water or oil, or if the probe had to be dismantled, before the battery condition could be checked; it is therefore desirable that the battery condition indicator be set to monitor the output from the battery when the probe is in air. When the conductivity sensor is the one that is provided with the resistor R1, the in-air Vin voltage detected at the surface may be about 7 volts when the 9 volt battery 60 is fresh, which is ample for the purpose of monitoring the battery condition. If the optical sensor were the sensor provided with the resistor, the apparatus could still be made to operate, but the voltage detectable at the surface corresponding to the in-air condition would be much less.

We claim:

1. Liquid-detecting apparatus, wherein:
   the apparatus includes a probe (20) which is suitable for passing down into a hole from a surface, and for detecting and identifying fluids present in the hole;
   the probe includes a first sensor (38);
   the probe includes a second sensor, being an optical sensor (39), which includes an electrically-derived light emitter (40);
   the two sensors include respective electrical on/off switches, which are responsive to the nature of the fluid in which the sensor is immersed, as detected by the sensor;
   the apparatus includes two relatively insulated electrical conductors (36) extending between the probe and the surface;
   the probe includes a dc battery (60), the arrangement of the probe being such that the battery passes physically down into the hole as a component of the probe;
   the electrical arrangement of the probe is such that, during operation of the apparatus, the battery supplies electrical energy to the light emitter, and is such that the said energy is supplied constantly to the said light emitter irrespective of the condition of the on/off switches in either of the two sensors;
   the probe includes a resistor (R1), the arrangement of the probe being such that the resistor passes physically down into the hole as a component of the probe;
   the resistor is assembled in series with the on/off switch of one of the sensors to form a sensor-sub-assembly;
   the said sensor-sub-assembly is assembled in parallel with the on/off switch of the other sensor to form a switch-sub-assembly;
   the switch-sub-assembly and the battery are assembled in series between the two conductors;
   the two sensors are so arranged in the switch-sub-assembly that the switch-sub-assembly in operation is effective to adopt three different electrical states in correspondence to three states of the probe in relation to the hole, namely: in-air, in-water, and in-oil;
   the apparatus is effective to provide the said three different electrical states of the switch-sub-assembly as three different voltage levels applied between the two conductors, being a maximum level, a minimum level and an intermediate level.

2. Apparatus of claim 1, wherein the first sensor is an electrical conductivity sensor.

3. Apparatus of claim 2, characterized in that the said first switch (73), with which the resistor is placed in series, is the switch of the conductivity sensor.

4. Apparatus of claim 1, characterized in that:
   the arrangement of the apparatus is such that the said three voltage levels between the two conductors (36) correspond to:
   (a) both switches being off, in which case the voltage between the two conductors is a minimum;
   (b) the first switch, with the resistor, being off, and the other switch being on, in which case the voltage between the two conductors is a maximum;
   (c) the first switch, with the resistor, being on, and the other switch being off, in which case the voltage between the two conductors is an intermediate value;

5. Apparatus of claim 1, characterized in that:
   the apparatus includes a suspension means, whereby the probe (20) is suspended from the surface;
   the suspension means comprises a tape (32), which is of such material and dimensions as to be substantially inextensible when the probe is suspended;

the two conductors (36) are embedded in the tape;

and the tape is provided with graduations whereby the depth of the probe from the surface can be read off.

6. Apparatus of claim 5, characterized in that the switch of the optical sensor (39) is so arranged in the probe as to change between on and off upon the probe becoming partially immersed in a liquid, up to a point D1 of the probe.

7. Apparatus of claim 6, characterized in that:

the optical sensor comprises a light emitter component (40), a light receiver component (43), and a refractor component (47);

the components are so arranged within the probe that when the probe is in air light from the emitter passes through the refractor and into the detector;

and the components are so arranged within the probe that when the probe is in a liquid light from the emitter is refracted by the refractor and does not, in substance, pass into the detector.

8. Apparatus of claim 7, characterized in that:

the refractor component (47) comprises a right-cylindrical tube of transparent material;

the emitter (40) and detector (43) components are positioned outside the tube, and are positioned on a chord of the tube, the chord being a substantial distance (50) off-centre with respect to the tube;

and the arrangement of the probe is such that liquids within the hole may pass inside the tube.

9. Apparatus of claim 8, characterized in that the said light is infra-red light.

10. Apparatus of claim 9, characterized in that the first sensor is an electrical conductivity sensor and the switch of the conductivity sensor (38) is so arranged in the probe as to change between on and off upon the probe becoming partially immersed in water, up to a point D2 of the probe.

11. Apparatus of claim 10, characterized in that:

the switch of the optical sensor is so arranged in the probe as to change between on and off upon the probe becoming partially immersed in a liquid, up to a point D1 of the probe;

and the points D1 and D2 on the probe coincide, and also the zero point of the tape coincides with the said points.

12. Apparatus of claim 10, characterized in that:

the probe includes an outer cover (27) of conductive material, and a bottom end cap (54) of insulative material;

a lowest point of exposure of the cover is so arranged as to make operative contact with liquid in the hole;

the probe includes a rod of metal (59), a lowest point of exposure of which is so arranged also as to make operative contact with liquid in the hole;

the conductivity sensor includes two electrodes, one of which comprises the cover, and the other of which comprises the rod;

the lowest point of exposure of the rod is positioned lower on the probe than the lowest point of exposure of the cover, whereby when the probe is lowered into a liquid the lowest point of exposure of the rod is well immersed into the liquid before the lowest point of exposure of the cover makes contact with the liquid.

13. Apparatus of claim 1, characterized in that:

the probe includes an operable on-off switch, which comprises a reed switch (67) and a magnet (68);

the probe has a body (25), and the reed switch is fixed to the body;

the probe includes a ring (69) which is mounted for rotation around the body, and the ring is so arranged as to be rotatable from a position where the magnet is operatively adjacent to the reed switch to a position where the magnet is operatively remote from the reed switch.

14. Apparatus of claim 1, characterized in that, at the surface, the apparatus includes a detecting means for detecting which of the said three voltage levels has been applied between the conductors (36);

the detecting means includes first and second voltage comparators (79, 80), each of which is set to provide a respective output signal according to whether the voltage between the conductors is more than, or less than, a reference voltage;

the reference voltage of the second comparator (80) is set to a value partway between the minimum voltage level and the intermediate voltage level, and the reference voltage of the first comparator (79) is set to a value partway between the intermediate voltage level and the maximum voltage level.

15. Apparatus of claim 14, characterized in that the apparatus includes a means (86) for adjusting the reference voltage of the first comparator.

* * * * *